United States Patent
Yoder et al.

(10) Patent No.: US 10,552,883 B2
(45) Date of Patent: *Feb. 4, 2020

(54) THIRD PARTY MERCHANT-FUNDED REWARDS ACCRUAL AND REDEMPTION NETWORK

(71) Applicant: Visa International Service Association, San Francisco, CA (US)

(72) Inventors: Jeanette Marie Yoder, San Mateo, CA (US); Derek Alan Vroom, San Mateo, CA (US); Mary Taylor, San Mateo, CA (US)

(73) Assignee: Visa International Service Association, San Francisco, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 15/922,087

(22) Filed: Mar. 15, 2018

(65) Prior Publication Data

US 2018/0204254 A1     Jul. 19, 2018

Related U.S. Application Data

(63) Continuation of application No. 12/878,954, filed on Sep. 9, 2010, now Pat. No. 9,953,352.

(Continued)

(51) Int. Cl.
    *G06Q 30/04*      (2012.01)
    *G06Q 20/02*      (2012.01)
    (Continued)

(52) U.S. Cl.
    CPC ............ *G06Q 30/04* (2013.01); *G06Q 20/02* (2013.01); *G06Q 20/10* (2013.01); *G06Q 20/28* (2013.01);

(Continued)

(58) Field of Classification Search
    None
    See application file for complete search history.

(56) References Cited

U.S. PATENT DOCUMENTS 6,018,718 A * 1/2000 Walker ............... G06Q 20/10
                                                705/14.17
8,155,999 B2 * 4/2012 de Boer ............. B01J 23/6562
                                                705/14.28

(Continued)

FOREIGN PATENT DOCUMENTS

KR     10-2007-0075986 A     7/2007
RU          2343542 C2     1/2009
(Continued)

OTHER PUBLICATIONS

International Search Report and Written Opinion for PCT Patent Application No. PCT/US2010/047860 dated May 24, 2011, 11 pages.

(Continued)

*Primary Examiner* — David J Stoltenberg
(74) *Attorney, Agent, or Firm* — Kilpatrick Townsend & Stockton LLP

(57) ABSTRACT

Systems and methods for administering merchant funded third-party administered rewards programs are provided. The system receives information about a transaction made using a payment device and determines whether the payment device is enrolled in the rewards program. If the payment device is enrolled in the rewards program, the system determines if the transaction qualifies for a reward. If the transaction qualifies for the reward, the system determines a rewards value for the transaction. Thereafter, the system determines a prepaid payment token associated with the payment device and instructs an issuer of the prepaid payment token to load the rewards value onto the prepaid payment token.

17 Claims, 7 Drawing Sheets

Related U.S. Application Data

(60) Provisional application No. 61/241,299, filed on Sep. 10, 2009, provisional application No. 61/243,984, filed on Sep. 18, 2009.

(51) Int. Cl.

| | |
|---|---|
| *G06Q 20/10* | (2012.01) |
| *G06Q 20/28* | (2012.01) |
| *G06Q 20/38* | (2012.01) |
| *G06Q 30/02* | (2012.01) |

(52) U.S. Cl.
CPC .......... *G06Q 20/387* (2013.01); *G06Q 30/02* (2013.01); *G06Q 30/0207* (2013.01); *G06Q 30/0215* (2013.01); *G06Q 30/0224* (2013.01); *G06Q 30/0255* (2013.01)

(56) References Cited

U.S. PATENT DOCUMENTS

| | | | | |
|---|---|---|---|---|
| 8,353,451 | B2* | 1/2013 | Rothwell | G06Q 20/20 235/380 |
| 8,636,203 | B1* | 1/2014 | Patterson | G06Q 20/12 235/379 |
| 2002/0107731 | A1 | 8/2002 | Teng | |
| 2003/0023549 | A1* | 1/2003 | Armes | G06Q 20/02 705/40 |
| 2003/0135462 | A1 | 7/2003 | Brake, Jr. et al. | |
| 2003/0236704 | A1 | 12/2003 | Antonucci | |
| 2004/0083170 | A1* | 4/2004 | Bam | G06Q 20/10 705/40 |
| 2005/0021400 | A1 | 1/2005 | Postrel | |
| 2006/0053056 | A1* | 3/2006 | Alspach-Goss | G06Q 20/10 705/14.17 |
| 2007/0100691 | A1 | 5/2007 | Patterson | |
| 2007/0150411 | A1* | 6/2007 | Addepalli | G06Q 20/10 705/39 |
| 2007/0267479 | A1 | 11/2007 | Nix et al. | |
| 2008/0021772 | A1 | 1/2008 | Aloni et al. | |
| 2008/0040261 | A1 | 2/2008 | Nix | |
| 2008/0059303 | A1 | 3/2008 | Fordyce | |
| 2008/0059306 | A1* | 3/2008 | Fordyce | G06Q 30/02 705/14.27 |
| 2008/0082418 | A1* | 4/2008 | Fordyce | G06Q 30/02 705/14.34 |
| 2008/0103968 | A1* | 5/2008 | Bies | G06Q 20/06 705/39 |
| 2008/0133350 | A1* | 6/2008 | White | G06Q 20/06 705/14.27 |
| 2008/0133351 | A1 | 6/2008 | White | |
| 2008/0201224 | A1 | 8/2008 | Owens | |
| 2008/0210753 | A1 | 9/2008 | Plozay et al. | |
| 2008/0217397 | A1 | 9/2008 | Degliantoni | |
| 2008/0228563 | A1* | 9/2008 | Zellner | G06Q 30/02 705/14.12 |
| 2008/0228582 | A1 | 9/2008 | Fordyce | |
| 2008/0255940 | A1 | 10/2008 | Perreault | |
| 2009/0006203 | A1 | 1/2009 | Fordyce, III | |
| 2009/0030793 | A1 | 1/2009 | Fordyce, III | |
| 2009/0099917 | A1* | 4/2009 | Haddad | G06Q 20/204 705/14.17 |
| 2009/0171778 | A1* | 7/2009 | Powell | G06Q 20/02 705/14.36 |
| 2009/0171794 | A1* | 7/2009 | Hogan | G06Q 20/04 705/17 |
| 2009/0204496 | A1* | 8/2009 | Otto | G06N 5/025 705/14.69 |
| 2009/0216638 | A1 | 8/2009 | Matthews | |
| 2009/0248506 | A1 | 10/2009 | Goldstein | |
| 2009/0299841 | A1* | 12/2009 | Bishop | G06O 20/02 705/14.21 |
| 2009/0299844 | A1 | 12/2009 | Reilly et al. | |
| 2010/0057551 | A1 | 3/2010 | Blaisdell | |
| 2010/0057553 | A1* | 3/2010 | Ameiss | G06Q 20/387 705/14.32 |
| 2010/0106579 | A1* | 4/2010 | Etheredge | G06Q 30/02 705/14.17 |
| 2010/0153194 | A1* | 6/2010 | Oram | G06Q 30/0207 705/14.1 |
| 2010/0191594 | A1 | 7/2010 | White | |
| 2010/0191652 | A1* | 7/2010 | Eckert | G06Q 20/204 705/67 |
| 2010/0274669 | A1 | 10/2010 | Carlson | |
| 2010/0312620 | A1 | 12/2010 | White | |
| 2010/0312634 | A1 | 12/2010 | Cervenka | |
| 2010/0332307 | A1 | 12/2010 | Parento | |
| 2011/0015960 | A1 | 1/2011 | Martin et al. | |
| 2011/0264499 | A1 | 10/2011 | Abendroth et al. | |
| 2012/0271703 | A1 | 10/2012 | Postrel | |
| 2018/0204254 | A1* | 7/2018 | Yoder | G06Q 20/02 |

FOREIGN PATENT DOCUMENTS

| | | |
|---|---|---|
| WO | 2005073887 A1 | 8/2005 |
| WO | 2005091843 A2 | 10/2005 |
| WO | 2008028514 A1 | 3/2008 |
| WO | 2009015222 A2 | 1/2009 |
| WO | 2011031640 A2 | 3/2011 |

OTHER PUBLICATIONS

International Preliminary Report on Patentability for PCT Application No. PCT/US2010/047860, dated Mar. 13, 2012, 6 pages.
Springbook, "Customer Loyalty Solutions" retrieved from www.springbookservices.com on Jan. 19, 2010, 1 page.
Springbook, "Remittance Solutions" retrieved from www.springbookservices.com on Jan. 19, 2010, 1 page.
Springbook, "What We Sell—Customized Prepaid Card Solutions" retrieved from www.springbookservices.com on Jan. 19, 2010, 3 pages.
Springbook, "Rebates and Disbursements" retrieved from www.springbookservices.com on Jan. 19, 2010, 1 page.
CardWerk, "Loyalty Card Solutions, Smart Membership and Gift Cards" retrieved from www.cardwerk.com on Jan. 19, 2010, 3 pages.
First Data, "Prepaid Rewards" www.firstdata.com 2008, 2 pages.
First Data, "Real-Time Rewards" www.firstdata.com 2009, 2 pages.
Mall Networks, "Merchant-Funded Loyalty Shopping Solutions" www.mallnetworks.com 4 pages.
Mall Networks, "Secrets of Successful Merchant-Funded Loyalty Shopping Programs: How Financial Institutions Can Succeed and Differentiate Where Others Fail" www.mallnetworks.com 11 pages.
Examination Report No. 1, 2010292478, dated Feb. 26, 2013, in Australian Patent Application No., 3 pages.
Office Action dated Apr. 25, 2014 (English Translation) in Russian Patent Application No. 2012113870, 7 pages.
Office Action, dated Jul. 31, 2015, in Canadian Patent Application No. 2,773,819.

* cited by examiner

| PAYMENT CARD NO. | PAYMENT TOKEN NO. |
|---|---|
| 4234 3456 1231 1234 | 6534 2345 1999 4000 |
| 4421 1256 2356 1290 | 5000 3214 4509 3480 |
| 4987 9999 1234 5454 | 1Cdx456UNF |

| PAYMENT CARD NO. | ENROLLED | REWARDS ADMINISTERING ENTITY (RAE) |
|---|---|---|
| 4234 3456 1231 1234 | YES | RAE # 1 |
| 4421 1256 2356 1290 | YES | RAE # 2 |
| 4987 0000 1234 5454 | NO | NA |

THIRD PARTY MERCHANT-FUNDED REWARDS ACCRUAL AND REDEMPTION NETWORK

CROSS-REFERENCES TO RELATED APPLICATIONS

The present application is a continuation application of U.S. application Ser. No. 12/878,954, filed on Sep. 9, 2010, which claims benefit under 35 U.S.C. § 119(e) of U.S. Provisional Patent Application No. 61/241,299, filed Sep. 10, 2009, and U.S. Provisional Patent Application No. 61/243,984, filed Sep. 18, 2009, the contents of which are hereby incorporated by reference in their entirety for all purposes.

BACKGROUND

Online shopping has been increasing exponentially over the past decade. Online shopping revenue now represents a significant portion of the overall shopping revenue generated by merchants. As online shopping continues to increase, merchants are looking into new ways to attract consumers to shop online. One of the ways for merchants to attract consumers to shop with them is to offer incentives to the consumers. Some of the most common incentives offered by merchants include cash back, discounts on items, reward points, or loyalty rewards.

However, since there are numerous shopping avenues on the Internet, it becomes difficult for a consumer to keep track of the merchants that offer incentives for shopping at their websites. In order to entice a consumer to increase his online shopping, merchants, credit card issuers, and payment processors are increasingly finding innovative ways to attract consumers.

Some merchants offer consumer loyalty programs in which a consumer is rewarded for purchasing products and services offered by the merchant. For example, a rewards program may be offered by an airline in conjunction with a payment device issued by an issuer, e.g., a debit or credit card. The payment device issued by the issuer may be co-branded with the airlines identity, and purchases made with that payment device may be eligible for rewards such as, frequent flier miles on the associated airlines. Similarly, structured rewards programs may offer rewards for other types of purchases. For example, a gasoline rewards card issued by a bank may offer the consumer rewards related to free or discounted gasoline purchases when the gasoline rewards card is used. The monetary value of the rewards offered may be funded by the merchant or the issuer of the payment device.

The current structure of such rewards programs suffer from numerous shortcomings. First, a merchant wishing to engage in a merchant-funded rewards program may typically partner with one or more issuers of payment devices in order to establish the rewards program. The issuer may receive information about all transactions conducted with the payment device as part of normal payment processing. The issuer may then determine which purchases qualify for rewards. Given that there are currently tens of thousands of different card issuers, it is impractical for a merchant to establish a rewards program with each and every issuer. Secondly, a consumer who does not carry a payment device issued by an issuer who has partnered with the merchant is precluded from participating in the rewards program. Additionally, the issuer is tasked with processing the transactions conducted to determine which transactions qualify for rewards. In this instance, it is impractical for a merchant to establish dynamic rewards criteria, as any such changes would need to be processed by each and every issuer with whom the merchant has partnered.

In other rewards structures, rather than partnering with issuers, the merchant may partner with an acquiring bank to obtain transaction data that may qualify for merchant rewards. The alternative structure suffers from the same problems as partnering with an issuer. First, the merchant must partner with each acquiring bank that may be used to process transactions conducted with the merchant. Given the large number of acquiring banks, such a solution is not practical. Secondly, just as above, the acquiring bank determines transactions that qualify for rewards based on criteria initially specified by the merchant. It is not practical for the merchant to establish dynamic criteria for rewards, as the acquiring banks may not be willing to allow constantly changing criteria. Additionally, the problem remains that even if the acquiring bank is able to notify the merchant of all rewards eligible transactions, the merchant still does not have a way to individually identify the consumer, other than by a transaction account number. There is no mechanism for delivering any accrued rewards benefits directly to the consumer.

In other methods, the issuer or acquirer may send transaction data for all payment devices enrolled in the merchant's reward program to the merchant. The merchant then has the responsibility to determine transactions that qualify for a reward, calculate the reward, and work with the issuer to post that reward to the consumer's account. In this instance, the merchant is burdened with additional data processing that is not his core expertise and moreover, consumers are apprehensive about their sensitive financial data being available to the merchant.

SUMMARY

Embodiments of the present invention provide a method for registering a user's payment device in a merchant funded, third-party administered rewards program. The method includes receiving information about a user's payment device, verifying the authenticity of the user's payment device, sending a request to a card issuing entity for issuing a prepaid payment token to the user, receiving information about the prepaid payment token, correlating the prepaid payment token to the user's payment device, and generating a notification indicating successful enrollment of the user's payment device in the rewards program.

The method further includes sending the information about the user's payment device to a payment processing network. In some embodiments, the prepaid payment token is linked to the user's payment device such that rewards received by using the payment device are redeemable via the prepaid payment token. In some embodiments, correlating the prepaid payment token to the user's payment device includes determining a first account number of the user's payment device, determining a second account number associated with the prepaid payment token, verifying that the first account number and the second account number are associated with the user, generating association information between the first account number and the second account number, and storing the association information in a database.

In other embodiments, a method for managing a rewards program is provided. The method includes receiving information about a transaction made using a payment device, determining whether the payment device is enrolled in the rewards program, determining if the transaction qualifies for a reward, determining a reward value for the transaction if the transaction qualifies for the reward, determining a prepaid payment token associated with the payment device, and instructing an issuer of the prepaid payment token to load the reward value onto the prepaid payment token.

In some embodiments, receiving information about a transaction comprises receiving information about an account number associated with the payment device. In some embodiments, determining a prepaid payment token associated with the payment device comprises receiving a first identification number associated with the payment device, and searching a database to determine a prepaid payment token that is associated with the first identification number.

Some embodiments of the present invention provide a computer-readable non-transitory storage medium including instructions which when executed by a processor embedded in a computer system cause the computer system to execute a method. The method includes receiving information about a transaction made using a payment device, determining that the transaction qualifies for a reward, determining a reward value for the transaction if the transaction qualifies for the reward, determining a prepaid payment token associated with the payment device, and instructing the issuer of the prepaid payment token to load the reward value onto the pre-paid prepaid payment token.

In some embodiments, the payment device includes at least one of a credit card, a debit card, a smart card, or a mobile payment device. In some embodiments, the prepaid payment token includes at least one of a physical card or an electronic token. In some embodiments, determining a prepaid payment token associated with the payment device comprises searching a database to determine the prepaid payment token that is linked to the payment device, wherein the database includes association information between one or more payment devices and one or more prepaid payment tokens.

In some embodiments, a method performed by a payment processing network is provided. The method comprises receiving information about a transaction from a merchant including an account number associated with a payment device, determining that the payment device is enrolled in a rewards program, determining a rewards administering entity associated with the rewards program, and communicating a portion of the information about the transaction to the rewards administering entity. In some embodiments, the information about the transaction comprises at least an account number associated with the payment device, a total amount for the transaction, and information about an item that was purchased as part of the transaction. In an embodiment, determining the rewards administering entity comprises searching a database that includes association information between the payment device and the rewards administering entity.

The following detailed description, together with the accompanying drawings will provide a better understanding of the nature and advantages of the present invention.

DETAILED DESCRIPTION

This disclosure relates to operating a loyalty program by a third party who is neither the merchant, nor the rewards card issuer, nor a payment device issuer. A third-party such as a payment processing network can operate a loyalty program for one or more merchants. Consumers can enroll in the program and are issued pre-paid payment tokens that are associated with the loyalty program. The third party can manage the implementation and operation of the loyalty program. The consumer can use a different payment device, e.g., a credit card, to perform purchase transactions at a merchant who participates in the loyalty program. The details of the purchase transactions are captured by the third party and the purchase transactions are analyzed to check if they qualify for a reward. Periodically, the third party will send the merchant the loyalty reward accrual statement for each consumer. The merchant can then load the appropriate reward points/amount, etc. on the consumer's prepaid payment token associated with the loyalty program. The consumer can use the accrued rewards on the prepaid payment token like any other normal prepaid card. Thus, a consumer can accrue reward points using a first payment device and the rewards points are loaded on a prepaid payment token that is different from the first payment device.

Embodiments of the present invention leverage the central nature of payment processing networks, such as VisaNet, to allow merchants to provide merchant-funded rewards programs to their consumers. The rewards programs are independent of any particular issuer or acquiring bank, thus allowing the merchant the ability to maximize the number of consumers eligible to participate in the rewards program. The rewards may be provided to the consumer on a VISA™, MasterCard™, or any other private label prepaid payment token. The rewards program may increase the number of transactions processed by the payment processing network during both the accrual of rewards as well as the redemption of rewards earned. Furthermore, because the merchant directly establishes reward criteria with the payment processing network, the merchant is given greater flexibility in determining the overall administration of the rewards program, e.g., specifying criteria for transactions to qualify for rewards.

Figure 1:
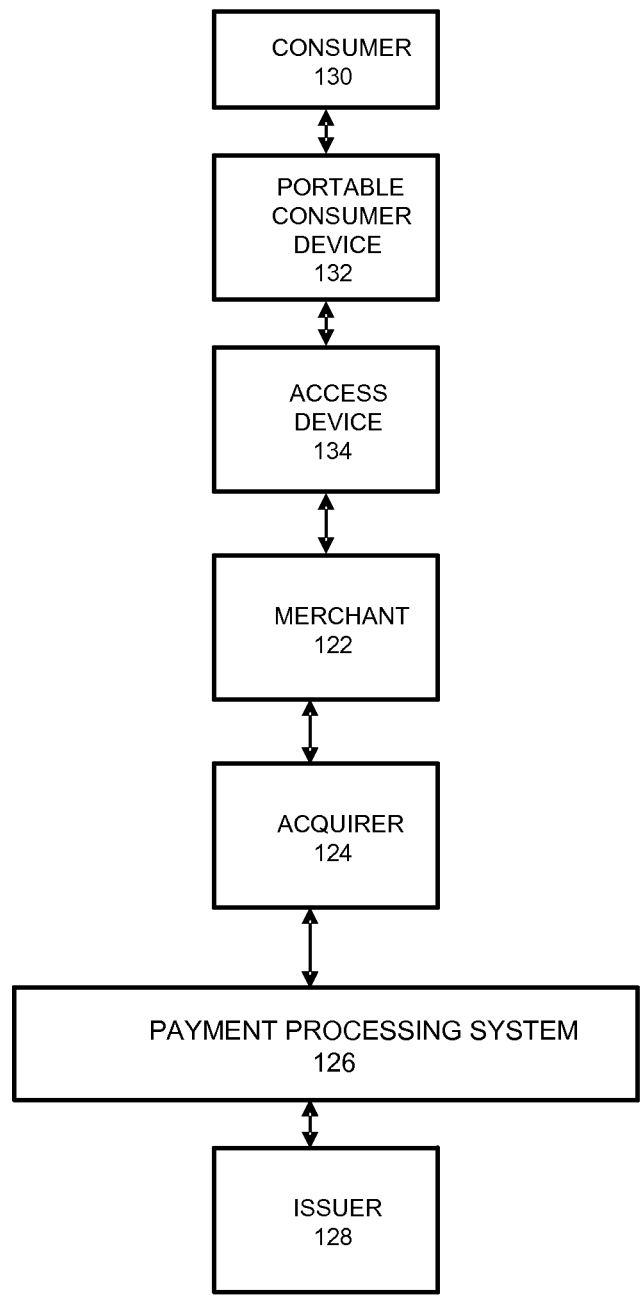
FIG. 1 is a block diagram illustrating a payment processing operation.

FIG. 1 shows a system 120 for performing a transaction using a payment processing system. System 120 includes a merchant 122 and an acquirer 124 associated with the merchant 122. In a typical payment transaction, a consumer 130 may purchase goods or services at merchant 122 using a portable consumer device 132. Acquirer 124 can communicate with an issuer 128 via a payment processing system 126. Consumer 130 may be an individual, or an organization such as a business that is capable of purchasing goods or services.

Portable consumer device 132 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment devices, security cards, access cards, smart media, transponders, and the like. The portable consumer devices can also be debit devices (e.g., a debit card), credit devices (e.g., a credit card), or stored value devices (e.g., a stored value card). A portable consumer device can be an example of a payment token or a payment device.

Payment processing system 126 may include data processing subsystems, networks, and operations used to support and deliver authorization services, exception file services, and clearing and settlement services. An exemplary payment processing system may include VisaNet™. Payment processing systems such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Payment processing system 126 may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The payment processing system 126 may use any suitable wired or wireless network, including the Internet.

Merchant 122 may also have, or may receive communications from, an access device 134 that can interact with portable consumer device 132. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like.

If access device 134 is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with portable consumer devices 132.

In a typical purchase transaction, consumer 130 purchases a good or service at merchant 122 using portable consumer device 132. The consumer's portable consumer device 132 can interact with access device 134 such as a POS (point of sale) terminal at merchant 122. For example, consumer 130 may take a credit card and may swipe it through an appropriate slot in the POS terminal. Alternatively, the POS terminal may be a contactless reader, and portable consumer device 132 may be a contactless device such as a contactless card.

An authorization request message is then forwarded to acquirer 124. After receiving the authorization request message, the authorization request message is then sent to payment processing system 126. Payment processing system 126 then forwards the authorization request message to issuer 128 of portable consumer device 132.

After issuer 128 receives the authorization request message, issuer 128 sends an authorization response message back to payment processing system 126 to indicate whether or not the current transaction is authorized (or not authorized). Payment processing system 126 then forwards the authorization response message back to acquirer 124. Acquirer 124 then sends the response message back to merchant 122.

After merchant 122 receives the authorization response message, access device 134 at merchant 122 may then provide the authorization response message for consumer 130. The response message may be displayed by the POS terminal, or may be printed out on a receipt.

At the end of the day, a normal clearing and settlement process can be conducted by payment processing system 126. A clearing process is a process of exchanging financial details between and acquirer and an issuer to facilitate posting to a consumer's account and reconciliation of the consumer's settlement position. Clearing and settlement can occur simultaneously.

Everyday millions of transactions performed by consumers using their payment device follows the basic flow illustrated in FIG. 1 above. Merchants have been looking at various ways to entice consumers to shop with them. An issuer also benefits if the consumer frequently uses a payment device issued by the issuer. The payment processing system, whose revenue is directly tied to the number of transactions processed, also benefits from the increased use of payment devices. One of the ways that a consumer may be enticed to increase his use of a payment device for purchasing is through the use of rewards programs. For example, the merchant can offer the consumer some rewards for shopping with the merchant, e.g., by offering a 10% discount on all purchases. The issuer can offer a cash-back reward if the consumer uses the payment device issued by the issuer.

As described above, however, it is not practical for a merchant to partner with numerous issuers and acquirers to implement such rewards program. Therefore, it is advantageous to have a third-party manage the rewards program for several merchants and/or issuers. This results in less overall cost to each merchant/issuer due to cost sharing and eliminates the need for each merchant to have its own rewards program.

Figure 2:
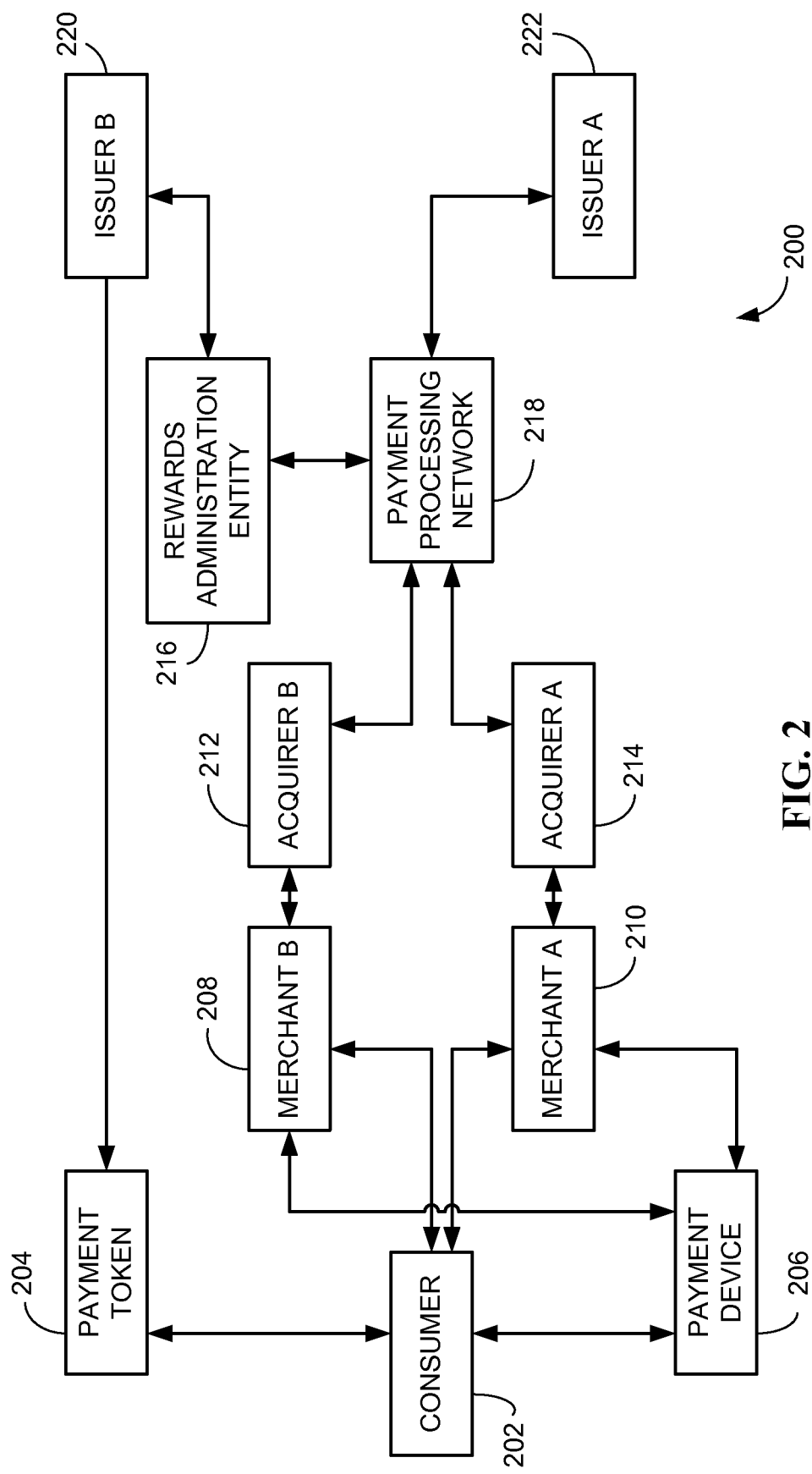
FIG. 2 is a block diagram for a system for managing a rewards program according to an embodiment of the present invention.

FIG. 2 illustrates a system 200 for managing a rewards program according to an embodiment of the present invention.

System 200 includes a consumer 202. Consumer 202 may be an individual or an entity. Consumer 202 has a payment device 206. Payment device 206 may be a credit card, a prepaid card, a smart card, or a contactless card embedded in a mobile device. Payment device 206 may be used to purchase goods and/or services from merchant A 210 and merchant B 208. Merchant B 208 has an acquirer B 212 associated with it and merchant A 210 has an acquirer B 214 associated with it. Acquirer A 214 and Acquirer B 212 perform similar function as acquirer 124 of FIG. 1.

When consumer 202 uses his payment device 206 at any of the merchants 208 or 210, the respective acquirers associated with the merchants communicate with a payment processing network 218 in order to process the payment. System 200 also includes an issuer A 222 that is associated with payment device 206. Any payment made with payment device 206 is approved by issuer A 222. System 200 also includes a rewards administration entity 216 that manages the rewards programs on behalf of one or more merchants. Rewards administration entity 216 is described in detail below. rewards administration entity 216 can communicate with an issuer B 220. Issuer B 220 can issue a prepaid payment token 204 to consumer 202 at the request of rewards administration entity 216.

In some embodiments, prepaid payment token 204 may be a physical card such as a prepaid card, a stored-value card, a rewards card, etc. In other embodiments, prepaid payment token 204 can be an electronic token, e.g., a token stored in a mobile payment device of consumer 202. In either case, issuer B 220 can load rewards value on prepaid payment token 204. In some embodiments, the rewards value may in the form of loyalty points, cash back, or any other form as directed by the merchant and/or issuer. Prepaid payment token 204 can be used to redeem the rewards value accumulated thereon. For example, if the rewards value is in the form of cash back and a consumer has $100 accumulated on prepaid payment token 204, the consumer can then use prepaid payment token 204 to purchase an item valued up to the maximum $ value ($100 in this case) accumulated on the prepaid payment token as of the time of the purchase.

In some embodiments, prepaid payment token can be configured to be used at any merchant regardless of whether the merchant is part of the rewards program. In some embodiments, the merchants participating in the rewards program may restrict the use of rewards value accumulated on prepaid payment token 204 to designated merchants only. For example, use of the prepaid payment token may be restricted such that the prepaid payment token may only be used at merchants participating in the rewards program. This ensures that the money stays with the merchants who are sharing the cost of managing the rewards program. In some embodiments, prepaid payment token 204 is reloadable, which means an issuer (or any other entity authorized by the issuer) can repeatedly load value onto prepaid payment token 204. The consumer can then use prepaid payment token 204 to make purchases as long as the balance is greater than zero.

In some embodiments, rewards administration entity 216 may partner with various issuers to issue prepaid payment token 204. In some embodiments, issuer A 222 of payment device 206 and issuer B 220 of prepaid payment token 204 are the same. In other embodiments issuer A 222 and issuer B 220 are different entities. In some embodiments, issuer B 220 may be a financial institution or any other entity that can issue prepaid payment tokens.

In some embodiments, a consumer may have to enroll one or more of his payment devices in the rewards program in order to start accumulating rewards value. In some embodiments, the consumer can earn rewards using a first payment device, e.g., payment device 206, and redeem the accrued rewards using a second payment device, e.g., prepaid payment token 204.

In some embodiments, rewards administration entity 216 and payment processing network 218 may be separate entities. In other embodiments, rewards administration entity 216 and payment processing network 218 may be managed and operated by a single entity. In operation, a consumer enrolls into the rewards program using at least one payment device. As part of the enrollment, a prepaid payment token is issued to the consumer. The prepaid payment token is linked to the payment device of the consumer. rewards administration entity 216 maintains the association information between a prepaid payment token and corresponding payment device. In some embodiments, a single prepaid payment token can be liked to multiple payment devices of the same consumer. Thereafter, whenever the consumer makes a qualifying purchase using any of the enrolled payment devices, the appropriate reward value is loaded onto the associated prepaid payment token. This increase the consumer's potential to earn rewards.

Figures 3, 4:
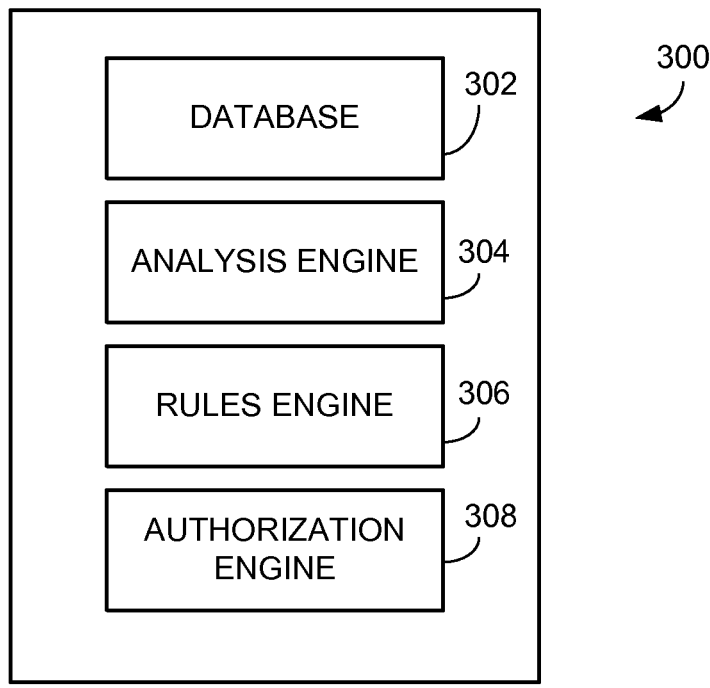
FIG. 3 is a block diagram illustrating the functional components of a rewards administration entity according to an embodiment of the present invention.
FIG. 4 is table showing the association information between a payment device and the prepaid payment token according to an embodiment of the present invention.

FIG. 3 is a functional block diagram of a rewards administration entity server system 300 according to an embodiment of the present invention. rewards administration entity server 300 includes a database 302, an analysis engine 304, a rules engine 306, and an authorization engine 308.

Database 302 may include a mapping table (not shown). The mapping table may include association information between a payment device of the consumer and a prepaid payment token that accumulates the rewards earned by the consumer. Details of the mapping table are described in relation to FIG. 4 below.

Analysis engine 304 is configured to analyze the received transaction data to determine whether the particular transaction qualifies for a reward. Analysis engine 304 communicates with rules engine 306 to make this determination. Rules engine 306 stores the rules related to the rewards programs. The rules may be specified by the merchant, the issuer, or both. The rules govern the qualification and disqualification of a transaction for the purposes of earning a reward. For example, a merchant may specify that only purchases over $100 made at the merchant using an enrolled payment device earn 1% cash back on that purchase. In some embodiments, an issuer may also specify rules, e.g., consumer will earn 1 airline mile for every $ spent on an airline ticket using an enrolled payment device issued by that issuer. Each issuer of a payment device may specify rules that are applicable to payment devices issued by that issuer. Thus, the system provides flexibility in managing and updating the criteria for the rewards program. In some embodiments, the merchants/issuers may send a periodic listing of rules to the rewards administration entity to update rules engine 306. In other embodiments, the rewards administration entity may provide the merchants/issuers access to the rules engine so that the merchants/issuers may update the rules at any time. In some embodiments, the access to rules engine 306 may be provided via a web portal.

In some embodiments, analysis engine 304 receives details of a transaction and consults with the rules engine to determine whether that particular transaction qualifies for a reward and if it does, also calculates a reward value, e.g., $ amount, airline miles, etc. for the transaction by applying the appropriate rule to that transaction. Once analysis engine 304 calculates the reward value, it communicates the reward value to authorization engine 308. Authorization engine 308 may perform other checks to determine eligibility for the reward. For example, authorization engine 308 may verify whether the consumer has defaulted on the payments for the payment device previously. If yes, the logic in authorization engine 308 may deny the reward or hold the reward from being credited to the consumer. In the event that authorization engine 308 determines that the reward is ready to be credited to the consumer, authorization engine 308 sends an authorization message along with the reward details to the issuer of the prepaid payment token. The issuer of the prepaid payment token and the rewards administration entity may reconcile their accounts for that transaction using the settlement process described above.

While rewards administration entity server system 300 is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including computer systems implemented using any combination of circuitry and software.

FIG. 4 shows a mapping table 400 that may be included in a rewards administration entity server, e.g., rewards administration entity server 300 of FIG. 3. Mapping table 400 includes a payment device number section 402 and a prepaid payment token number section 404. During the enrollment process, the consumer provides details of his payment device to the rewards administration entity. In some embodiments, the details include a personal account number (PAN) associated with the payment device. The PAN of the payment device is stored in section 402. In addition, the issuer of the prepaid payment token sends the information about the prepaid payment token to the rewards administration entity. In some embodiments, the information includes an account number associated with the prepaid payment token. In other embodiments, the information may include an alphanumeric identifier or any other identifier used to uniquely identify the prepaid payment token. The information about the prepaid payment token is stored in section 404. The rewards administration entity generates correlation/association information between a payment device and a prepaid payment token issued to the same consumer. In some embodiments, a consumer may enroll more than one payment device. In such instances, a single prepaid payment token may be associated with multiple payment devices. However, the prepaid payment token and associated payment device/s have to be issued to the same consumer. In some embodiments, during a rewards accrual process, the rewards administration entity receives the PAN of the payment device and uses mapping table 400 to determine the corresponding prepaid payment token. Once the prepaid payment token is identified, the rewards administration entity may optionally identify the issuer of the prepaid payment token and send an authorization message to the issuer to load a certain reward value on the prepaid payment token. In some embodiments, the authorization message includes the prepaid payment token identifier.

However, it is to be understood that the mapping table is provided merely for illustrative purposes and one skilled in the art will realize numerous other ways of storing the association information are possible. In addition, mapping table 400 may have more or less information than what is illustrated in FIG. 4. One skilled in the art will recognize many variations.

Figures 5A, 5B:
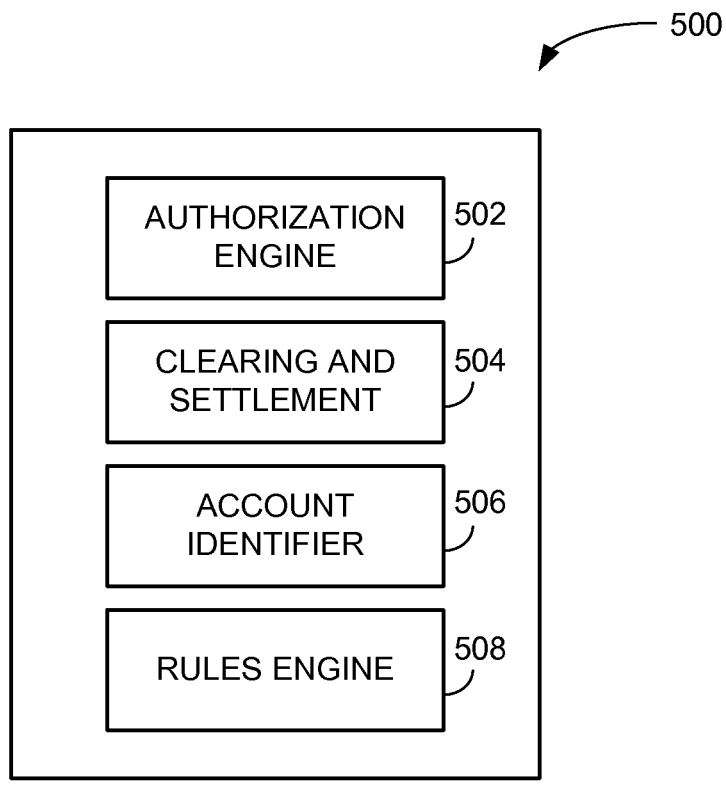
FIG. 5A is a block diagram illustrating the functional components of a payment processing network according to an embodiment of the present invention.
FIG. 5B illustrates a table listing association information between a payment device and a rewards administering entity according to an embodiment of the present invention.

As discussed above, the rewards administration entity receives details of a transaction from a payment processing network. FIG. 5A illustrates a functional block diagram of a payment processing network server 500. Payment proceeding network server 500 includes an authorization engine 502, a clearing and settlement engine 504, an account identifier 506, and a rules engine 508.

Authorization engine 502 is configured to interact with an issuer of a payment device and an acquirer associated with a merchant to facilitate authentication and payment authorization messages. Payment processing network server 500 performs functions similar to those described in connection with payment processing system 126 of FIG. 1. In some embodiments, authorization engine 502 analyses the transaction data to determine if a particular payment device is enrolled in a rewards program. Thus, authorization engine 502 may provide initial screening to determine whether a particular transaction is eligible for a reward. In some embodiments, the transaction data received by authorization engine 502 includes the personal account number (PAN) associated with the user's payment device, among other information. Authorization engine 502 may, in conjunction with rules engine 508, check to see whether that particular payment device is enrolled in a rewards program. Based on that determination, authorization engine 502 may decide whether to send the transaction data to the rewards administration entity. In some embodiments, the transaction data sent to the rewards administration entity may be a subset of the transaction data received by authorization engine 502.

Clearing and settlement engine 504 comprises logic to reconcile the transactions with the issuer and the acquirer. The clearance and settlement process is described above in relation to FIG. 1 and is not repeated here in the interest of brevity.

Account identifier 506 may include, e.g., a list of PAN numbers associated with various user payment devices and information indicating whether the payment devices are enrolled in any rewards program. As discussed above, a user may enroll one or more of his payment devices in one or more rewards programs offered by one or more rewards administration entities. Thus, in some embodiments, the account identifier may potentially include a very complex data structure that includes the relationship between payment devices and their respective rewards program enrollment. In some embodiments, the information regarding the payment device and its associated rewards program enrollment details are provided to account identifier 506 by a rewards administration entity. In other embodiments, this information may be provided by an issuer of the payment device. Thus, in an embodiment, whenever a user uses his payment device to make a purchase, the transaction data is captured by payment processing network server 500 as part of the normal payment processing process. The transaction data is then analyzed and the PAN of the payment device is checked against the information in account identifier 506 to determine if the payment device is enrolled in any rewards program. In some embodiments, account identifier may comprise information that indicates whether a payment device is enrolled in a rewards program and if yes, the details of the rewards administration entity associated with that rewards program. FIG. 5B illustrates a sample table that may be stored in payment processing network server 500.

FIG. 5B illustrates a correlation table 550 that stores the relationship between various payment devices and their associated rewards programs and rewards administration entities according to an embodiment of the present invention. Table 550 includes section 552 that lists account numbers associated with various payment devices for which payment processing network server 500 provides the payment processing capability. In an embodiment, section 552 may include listing of payment devices associated with a single payment processing system like VISA® or MASTERCARD®. In other embodiments, the listing can include payment devices usable on various payment processing systems such as, VISA®, MASTERCARD®, DISCOVER®, AMEX®, etc. Table 550 can also include section 554 that indicates whether a particular payment device is enrolled in any rewards program. Section 556 lists the rewards administration entity associated with the rewards program that the payment device is associated with. In some embodiments, after payment processing network server 500 receives the transaction details from the merchant, it consults table 550 to determine whether the payment device used in the transaction is enrolled in any rewards program. If yes, payment processing network server 500 identifies the rewards administration entity associated with the rewards program and sends the transaction information to that rewards administration entity. In some embodiments, payment processing network server 500 may service multiple rewards administration entities.

However, it is to be understood that the table 550 is provided merely for illustrative purposes and one skilled in the art will realize numerous other ways of storing the association information are possible. In addition, table 550 may have more or less information than what is illustrated in FIG. 5B. One skilled in the art will recognize many variations.

Returning back to FIG. 5A, rules engine 508 may include one or more rules for processing payment transactions and/or include rules related to one or more rewards programs. For example, rules engine 508 may include rules to determine if the user of the payment device is in good standing with the issuer and if not, the payment device may be ineligible to earn any rewards even if the payment device is enrolled in a rewards program. In an embodiment, if the user is not in good standing with regards to the payment device, account identifier 506 may not perform the processing to determine if the payment device is enrolled in a rewards program. In other embodiments, rules engine 508 may include rules similar to the ones resident in the rules engine of the rewards administration entity server described above. In this embodiment, payment processing network server 500 also acts as the rewards administration entity.

While the payment processing network server 500 is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

Figure 6:
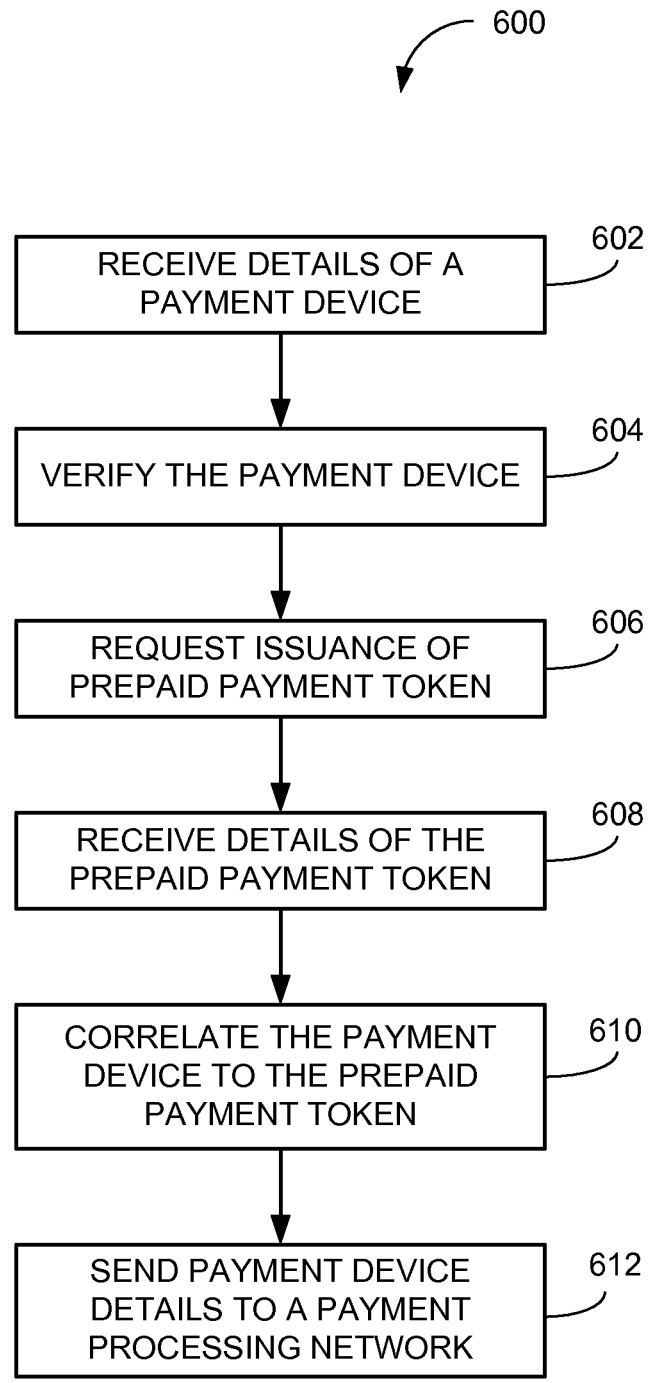
FIG. 6 is a flow diagram of a process for enrolling a user's payment device in the rewards program according to an embodiment of the present invention.

In some embodiments, a user may need to enroll his payment device with the rewards administration entity in order to start accruing rewards. Once enrolled, the consumer may start accumulating rewards on his purchases made using the enrolled payment device. A consumer may enroll more than one payment device in the rewards program. FIG. 6 is a flow diagram of a process 600 for enrolling a consumer's payment device in a rewards program according to an embodiment of the present invention. Process 600 may be performed e.g., by rewards administration entity 216 of FIG. 2. In some embodiments, the rewards administration entity may provide a user interface for the consumer to interact with the rewards administration entity server. For example, the rewards administration entity may provide a dedicated web portal for the consumer to enter the requested information for enrolling into a rewards program. In other embodiments, the consumer may be provided with a dedicated phone number, e.g., 1-800-enroll, to call for enrolling into the rewards program. It is to be understood that the embodiments of the invention are not limited to the implementations described above and any other suitable means of obtaining consumer information may be used.

At step 602, the system, e.g., a rewards administration entity 216 of FIG. 2, receives information about the consumer's payment device (e.g., payment device 206 of FIG. 2). In some embodiments, in addition to the information about the payment device, the system may request other information as needed. In some embodiments, information about the payment device includes a personal account number (PAN) associated with the device, expiration date of the payment device, issuer information, etc. Upon receiving the information about the payment device, the system verifies that the payment device is authentic at step 604. Verification is done to ensure that the payment device belongs to the consumer and that the payment device is valid, among other things. In some embodiments, the system may communicate with the issuer of the payment device to verify its authenticity.

Once the authenticity of the payment device has been verified, the system contacts an issuer (e.g., issuer B 200 of FIG. 2) and sends a request to the issuer for issuing a reloadable prepaid payment token (e.g., prepaid payment token 204 of FIG. 2), at step 606. The issuer of the prepaid payment token may be same as the issuer of the payment device or may be any another issuer with whom the rewards administration entity has contracted for issuing the prepaid payment tokens. The issuer may perform some additional checks prior to issuing a prepaid payment token. As described above, a prepaid payment token may be a physical card such as a prepaid debit card, stored-value card, or a smart card. In some embodiments, the prepaid payment token can also be an electronic token stored in a contactless card inside a mobile payment device. At step 608, the system receives the details of the prepaid payment token from the issuer. The details of the prepaid payment token may include an account number, a token identifier, e.g., an alphanumeric sequence of characters, and other information. In some embodiments, the prepaid payment token may be generic and can be used on any one of the payment processing networks like VISA® or MASTERCARD®. In some embodiments, the prepaid payment token may be a private label token that provides the issuer or the merchant the ability to put their brand name on the card. The type of prepaid payment token issued is based on the contractual terms between the merchant, the rewards administration entity, and the issuer. In some embodiments, the prepaid payment token may be used at any merchant. In other embodiments, the use of the prepaid payment token may be restricted to certain merchants, class of merchants, items, class of items, etc. For example, if there are 50 merchants participating in a single rewards program, they may restrict the use of the prepaid payment token only at the 50 participating merchants.

Upon receiving the details about the prepaid payment token, the system creates association information between the consumer payment device and the prepaid payment token issued to the consumer at step 610. In some embodiments, the association information is stored in a database e.g., as mapping table 400 of FIG. 4. In some embodiments, a consumer may enroll more than one payment device. In this instance, a single prepaid payment token may be associated with all the enrolled payment devices for the consumer.

After the association information is generated and stored, the system sends the information about the consumer's payment device to a payment processing network at step 612. The information sent to the payment processing network comprises information about the rewards program that the payment device is enrolled in. The payment processing network uses this information to screen transactions for potential rewards eligible payment devices. Optionally, the system may send a notification to the consumer of successful enrollment in the rewards program.

It should be appreciated that the specific steps illustrated in FIG. 6 provide a particular method of enrolling a consumer payment device in a rewards program according to an embodiment of the present invention. Other sequences of steps may also be performed according to alternative embodiments. For example, alternative embodiments of the present invention may perform the steps outlined above in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 7:
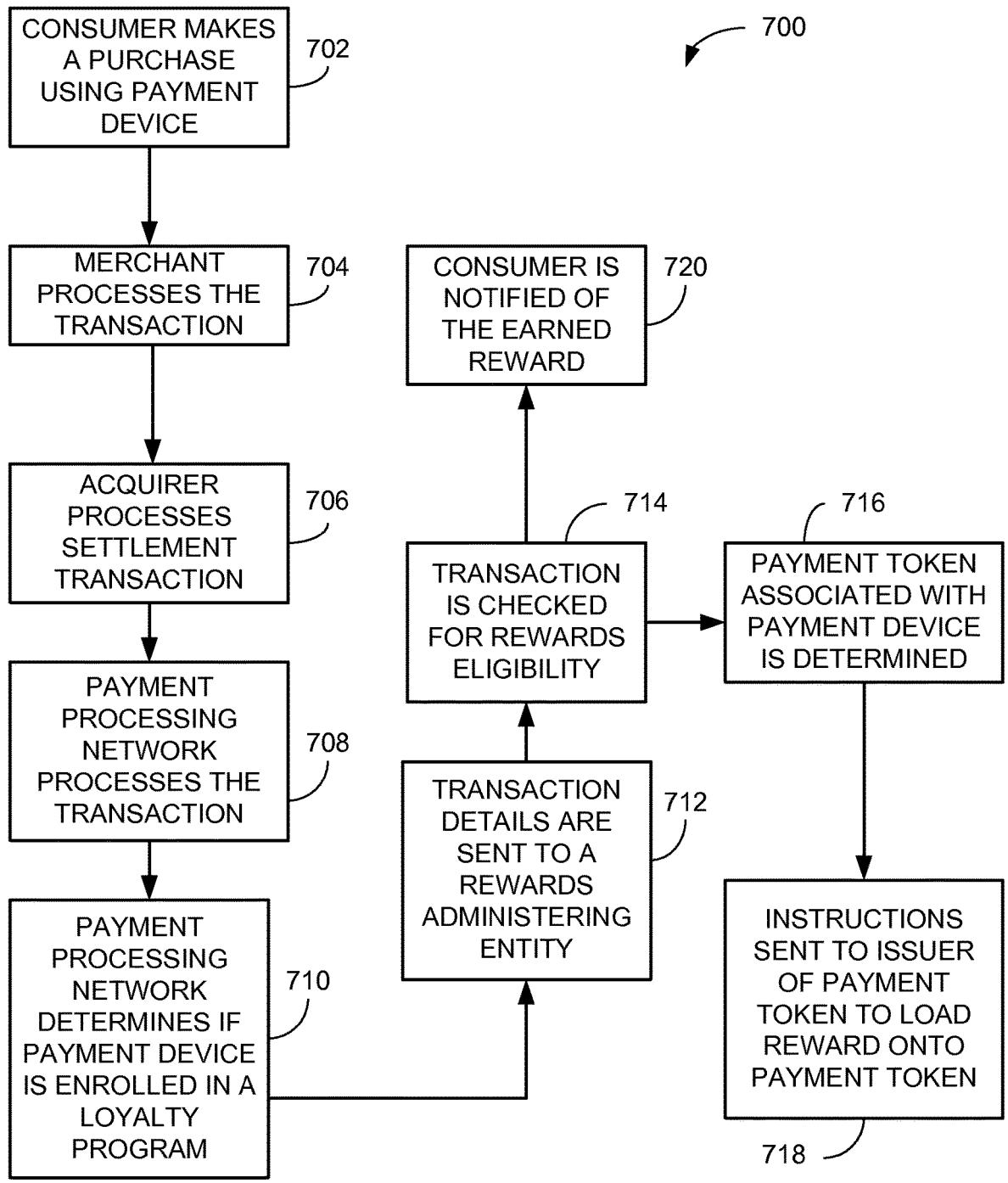
FIG. 7 is a flow diagram of a process for managing a rewards program according to an embodiment of the present invention.

Once the consumer enrolls his payment device in the rewards program, he may start accruing rewards on the purchases he makes using the payment device at participating merchants. FIG. 7 is a flow diagram of a process 700 for a rewards accrual process according to an embodiment of the present invention.

At step 702 the consumer (e.g., consumer 202 of FIG. 2) uses his enrolled payment device to make a purchase at one of the participating merchants in the rewards program. The merchant (e.g., merchant A or B of FIG. 2) processes the purchase transaction, e.g., as described in FIG. 1 above, using a POS device or other such device at step 704. An acquirer (e.g., acquirer A or B of FIG. 2) associated with the merchant receives the transaction details at step 706. At step 708, a payment processing network (e.g., payment processing network 218 of FIG. 2) processes the payment transaction in conjunction with an issuer (e.g., issuer A 222 of FIG. 2) of the payment device. As part of the transaction information, the payment processing network receives the details of the payment device used by the consumer. The payment processing network then determines whether the payment device is enrolled in a rewards program at step 710. In some embodiments, information about enrolled payment devices is provided to the payment processing network by the rewards administration entity (e.g., rewards administration entity 216 of FIG. 2), as described above. The payment processing network may use the information provided by the rewards administration entity to locate eligible payment devices from the transaction information, e.g., using table 550 of FIG. 5B. If the payment processing network determines that the payment device is enrolled in a rewards program administered by the rewards administration entity, it sends the transaction details including information about the payment device to the rewards administration entity at step 712. In some embodiments, the information sent by the payment processing entity may include an account number associated with the payment device, a total amount for the transaction, and information about an item that was purchased as part of the transaction.

The rewards administration entity then analyzes the transaction to determine if the transaction is eligible for a reward at step 714. As described above, determination of eligibility is based on criteria specified by the rewards administration entity, the merchant, and/or the issuer of the payment device. If it is determined that the transaction is eligible for a reward, the rewards administration entity calculates a reward value for that transaction. At step 716, the rewards administration entity can determine a prepaid payment token associated with the payment device, e.g., by using the mapping table 400 of FIG. 4. Once the associated prepaid payment token is determined, the rewards administration entity can send instructions to the issuer (e.g., issuer B 220 of FIG. 2) of the prepaid payment token to load the reward value on the prepaid payment token at step 718. Additionally, the rewards administration entity may also send a message to the consumer notifying the consumer of the earned reward, at step 720. The issuer of the prepaid payment token loads the reward value on the prepaid payment token. The consumer may verify that the reward has been loaded onto the prepaid payment token and is now free to use the reward.

It should be appreciated that the specific steps illustrated in FIG. 7 provide a particular method of accruing rewards according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives. For instance, in an embodiment, steps 710, 714, 716 and 718 may be performed by the payment processing network thus eliminating step 712. In this instance, the payment processing network also performs the functions of the rewards administration entity in addition to other functions.

Several benefits are realized by the rewards program described above. For the merchants, it highly simplifies the process of administering and managing a rewards program. Since most of the work is done by a third-party, e.g., the rewards administration entity, the merchants can focus on their core competence of selling and offering products to the consumers rather than spending time and resources in managing a rewards program. Since several merchants can share the cost of managing the rewards program, the investment by merchants is much less than a self-managed program. This will likely encourage more merchants to join rewards programs reducing the overall cost even more. By pooling their resources, merchants can gain exposure to a larger consumer base increasing their sources of revenue.

For the consumer, having a single prepaid payment token that he can use to redeem rewards accrued by using various payment devices is very convenient. Also, since a consumer can enroll multiple payment devices in the rewards program, he can increase his potential for accruing rewards. The consumer is free to use the prepaid payment token to buy the item of his choice just as he would with an ordinary prepaid card, without having to be restricted to merchant and/or rewards catalogs or other such restrictions.

Since the rewards administration entity receives the transaction details from a single source, e.g., the payment processing network, the determination of eligibility for rewards and the actual calculation of rewards value is greatly simplified. For example, in the absence of a single source, the rewards administration entity would have to receive inputs from each acquirer bank and/or the issuer bank whose payment devices are enrolled in the rewards program. In this instance, the rewards administration entity may end up having to coordinate data from potentially hundreds of sources, which makes data management very inconvenient and error prone. By having the payment processing network provide the transaction data, the rewards administration entity can receive transaction data for all the payment devices from a single source. In some embodiments, the payment processing network may send the transaction data periodically to the rewards administration entity, e.g., daily, monthly, or any other interval determined by the rewards administration entity. In addition, transaction data provided by the merchant, the issuer, the acquirer and the payment processing network differs in content, with the data provided by the payment processing network having the most detail and relevance for the rewards administration entity to calculate the appropriate reward value for each transaction conducted using an enrolled payment device. One of the reasons for this is because the payment processing network is part of the payment processing/authorization system, the data captured by the payment processing network is more detailed than data available to any other entity.

Figure 8:
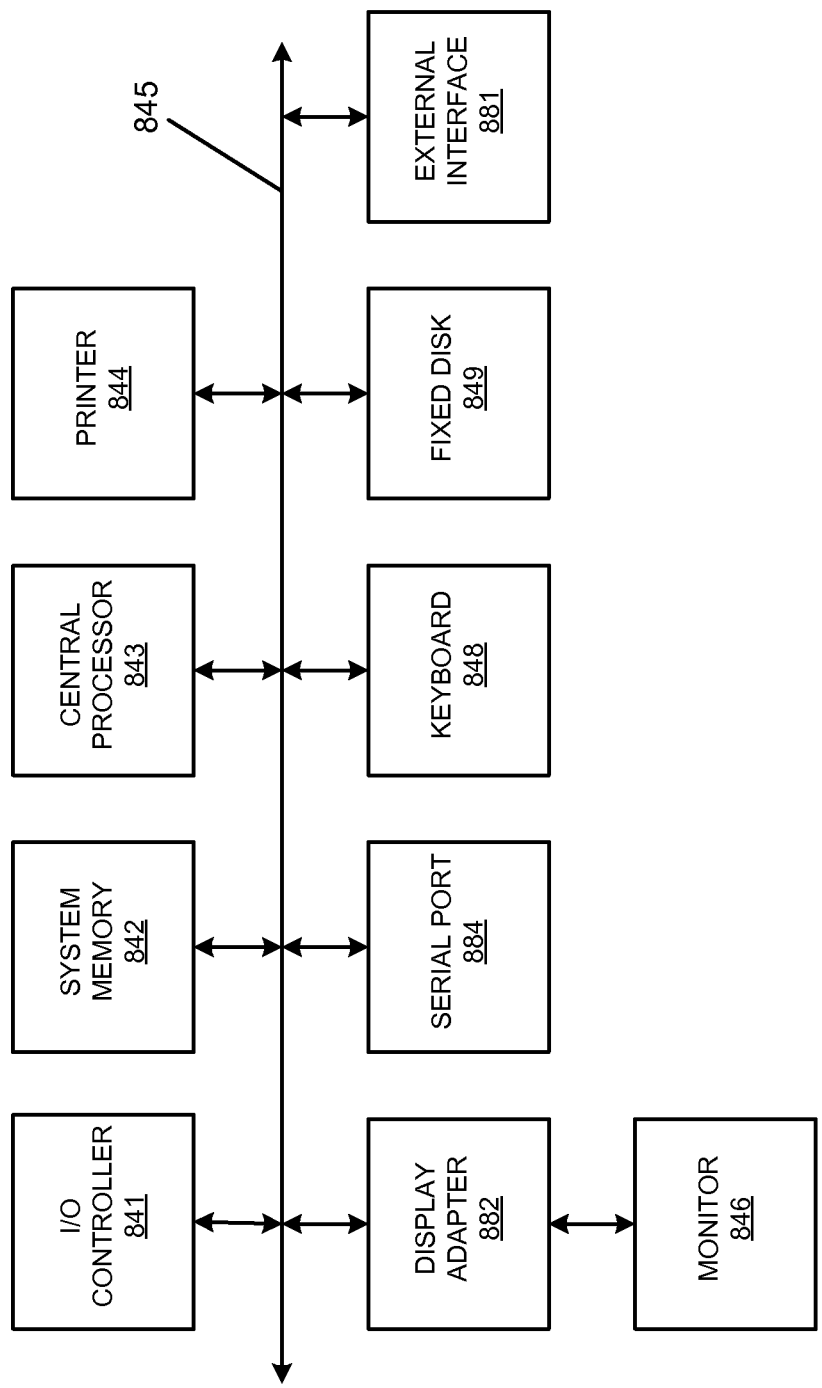
FIG. 8 is a block diagram of a computer system.

FIG. 8 is a high level block diagram of a computer system that may be used to implement any of the individual components described above and may include one or more of the subsystems or components shown in FIG. 8, which is a block diagram of a computer apparatus. The subsystems shown in FIG. 8 are interconnected via a system bus 845. Additional subsystems such as printer 844, keyboard 848, fixed disk 849, monitor 846, which is coupled to display adapter 882, and others are shown. Peripherals and input/output (I/O) devices, which couple to I/O controller 841, can be connected to the computer system by any number of means known in the art, such as serial port 884. For example, serial port 884 or external interface 881 can be used to connect the computer apparatus to a wide area network such as the Internet, a mouse input device, or a scanner. The interconnection via system bus 845 allows central processor 843 to communicate with each subsystem and to control the execution of instructions from system memory 842 or fixed disk 849, as well as the exchange of information between subsystems. The system memory 842 and/or fixed disk 849 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A method comprising:
    receiving, by a rewards administering entity server computer, from a computer system, first transaction data indicating details about a first transaction processed by the computer system based on communicating with a first issuer computer of a first issuing entity, wherein the first transaction is conducted, using a payment device that is issued by a first issuing entity, with a first merchant of a plurality of merchants;
    determining, by the rewards administering entity server computer, whether the payment device is enrolled in a rewards program, wherein determining whether the payment device is enrolled in the rewards program includes querying a device enrollment database to identify a first association between the payment device and a rewards administration entity that operates the rewards administering entity server computer;
    receiving, by the rewards administering entity server computer, from the computer system, second transaction data indicating details about a second transaction processed by the computer system based on communicating with the first issuer computer, wherein the second transaction is conducted, using the payment device, with a second merchant of the plurality of merchants;
    upon determining that the payment device is enrolled in the rewards program based on the first association between the payment device and the rewards administration entity, determining, by the rewards administering entity server computer, whether transactions conducted using the payment device qualify for a reward for use of the payment device;
    determining, by the rewards administering entity server computer, a reward value for the transactions upon determining that the transactions conducted using the payment device qualify for the reward;
    identifying, by the rewards administering entity server computer, a rewards payment token on or in a form of a device associated with the payment device that is enrolled in the rewards program, wherein identifying the rewards payment token associated with the payment device includes:
    identifying a second association between account information associated with the rewards payment token and account information associated with the payment device;
    identifying, by the rewards administering entity server computer, using the second association, a second issuing entity as an issuer of the rewards payment token, wherein the second issuing entity is different from the first issuing entity; and
    sending, by the rewards administering entity server computer, to a second issuer computer system operated by the second issuing entity, an authorization message indicating an instruction to the second issuer computer system operated by the second issuing entity to load the reward value determined, based on the second association, for the transactions in the rewards payment token on or in the form of the device, wherein the instruction causes the second issuer computer system operated by the second issuing entity to load or store the reward value in the rewards payment token on or in the form of the device.

2. The method of claim 1 wherein receiving the first transaction data comprises receiving the account information associated with the payment device.

3. The method of claim 1 wherein the device that has the form of or includes the rewards payment token is different from the payment device, and wherein the device is a physical card.

4. The method of claim 1 wherein the device that has the form of or includes the rewards payment token is a mobile payment device that is different from the payment device, and wherein the rewards payment token is an electronic token stored on the mobile payment device.

5. The method of claim 1 wherein the first transaction conducted using the payment device involves the first merchant, and wherein the reward value loaded on the rewards payment token is redeemable for one or more transactions involving the second merchant.

6. The method of claim 1 wherein the payment device is one of a plurality of payment devices that are enrolled in the rewards program, wherein each of the plurality of payment devices is associated with at least one rewards payment token, wherein a set of payment devices of the plurality of payment devices is associated with a consumer, and wherein an account number of each of the set of payment devices is associated with the account number associated with the rewards payment token.

7. The method of claim 1, wherein identifying the rewards payment token associated with the payment device further includes determining the account information associated with the payment device.

8. A rewards entity server computer comprising a processor, and a non-transitory computer-readable storage medium including instructions which, when executed by a processor embedded in a computer system, cause the computer system to execute a method comprising:
receiving, from a computer system, first transaction data indicating details about a first transaction processed by the computer system based on communicating with a first issuer computer of a first issuing entity, wherein the first transaction is conducted, using a payment device that is issued by a first issuing entity, with a first merchant of a plurality of merchants;
determining whether the payment device is enrolled in a rewards program, wherein determining whether the payment device is enrolled in the rewards program includes querying a device enrollment database to identify a first association between the payment device and a rewards administration entity that operates the rewards administering entity server computer;
receiving from the computer system, second transaction data indicating details about a second transaction processed by the computer system based on communicating with the first issuer computer, wherein the second transaction is conducted, using the payment device, with a second merchant of the plurality of merchants;
upon determining that the payment device is enrolled in the rewards program based on the first association between the payment device and the rewards administration entity, determining whether transactions conducted using the payment device qualify for a reward for use of the payment device;
determining a reward value for the transactions upon determining that the transactions conducted using the payment device qualify for the reward;
identifying a rewards payment token on or in a form of a device associated with the payment device that is enrolled in the rewards program, wherein identifying the rewards payment token associated with the payment device includes:
identifying a second association between account information associated with the rewards payment token and account information associated with the payment device;
identifying using the second association, a second issuing entity as an issuer of the rewards payment token, wherein the second issuing entity is different from the first issuing entity; and
sending to a second issuer computer system operated by the second issuing entity, an authorization message indicating an instruction to the second issuer computer system operated by the second issuing entity to load the reward value determined, based on the second association, for the transactions in the rewards payment token on or in the form of the device, wherein the instruction causes the second issuer computer system operated by the second issuing entity to load or store the reward value in the rewards payment token on or in the form of the device.

9. The rewards entity server computer of claim 8 wherein the payment device comprises at least one of a credit card, a debit card, a smart card, or a mobile payment device.

10. The rewards entity server computer of claim 8 wherein the device that has the form of or includes the rewards payment token is different from the payment device, and wherein the device is a physical card.

11. The rewards entity server computer of claim 8 wherein the plurality of merchants are members of a rewards program, and wherein one or more merchants at which the rewards payment token is redeemable are included in the plurality of merchants.

12. The rewards entity server computer of claim 8 wherein identifying the second association comprises searching a database to determine the rewards payment token is on or in the form of the device that is associated with the payment device, and wherein the database includes association information between a plurality of payment devices and one or more rewards payment tokens.

13. A method comprising:
receiving, by a computer system, first transaction data about a first transaction conducted with a first merchant of a plurality of merchants, the first transaction data including an account number associated with a payment device issued by a first issuing entity, wherein the first transaction is conducted using the payment device, and wherein the first transaction is processed by the computer system based on communication with a first issuer computer of the first issuing entity;
determining, by the computer system, that the payment device is enrolled in a rewards program, wherein determining that the payment device is enrolled in the rewards program includes identifying an association between the account number associated with the payment device and an account number associated with a payment token, and wherein a plurality of payment devices are enrolled in the rewards program and are associated with a consumer, and wherein the account number of the payment token is associated with an account number of each of the plurality of payment devices;

determining, by the computer system, a rewards administering entity associated with the rewards program;

receiving, by the computer system, second transaction data about a second transaction conducted with a second merchant of the plurality of merchants, the second transaction data including the account number associated with the payment device issued by the first issuing entity, wherein the second transaction is conducted using the payment device, and wherein the second transaction is processed by the computer system based on communication with the first issuer computer;

communicating, by the computer system, a portion of the first transaction data about the first transaction and the second transaction data about the second transaction to a server computer of the rewards administering entity, wherein the portion of the first transaction data about the first transaction and the second transaction data about the second transaction causes the server computer to:
- identify the payment token on or in a form of a device associated with the payment device that is enrolled in the rewards program,
- identify a second issuing entity as an issuer of the payment token, wherein the second issuing entity is different from the first issuing entity, and
- send, to a second issuer computer operated by the second issuing entity, an authorization message indicating an instruction to the second issuer computer operated by the second issuing entity to load or store a reward value determined for transactions in the payment token on or in the form of the device upon determining that the transactions qualify for a reward, wherein the instruction causes the second issuer computer operated by the second issuing entity to load or store the reward value in the payment token on or in the form of the device, and wherein the payment token is configured for the reward value loaded in the payment token to be redeemable at one or more merchants.

14. The method of claim 13 wherein the portion of the first transaction data about the first transaction and the second transaction data about the second transaction comprises at least the account number associated with the payment device, a total amount for each of the first transaction and the second transaction, and information about a first item that was purchased as part of the first transaction and about a second item that was purchased as part of the second transaction.

15. The method of claim 13 wherein the device that has the form of or includes the payment token is different from the payment device, and wherein the device is a physical card.

16. The method of claim 13 wherein the device that has the form of or includes the payment token is a mobile payment device that is different from the payment device, and wherein the payment token is an electronic token stored on the mobile payment device.

17. The method of claim 13 wherein the rewards administering entity uses the portion of the first transaction data and the second transaction data determine whether the transactions qualifies for the reward, and wherein the reward value corresponding to the reward is loaded on the payment token by the second issuer computer operated by the second issuing entity that issued the payment token.

* * * * *